United States Patent
Coutts et al.

[19]

[11] Patent Number: 6,104,337

[45] Date of Patent: Aug. 15, 2000

[54] DISTANCE INDICATOR SYSTEM FOR GOLF

[76] Inventors: Gordon Coutts, 65 Main St., Brampton, Ontario, Canada, L6Y 1M9; Leslie Subryan, 22 Bernadotte Dr., Markham, Canada, L6C 1E2; James Hendershot; Ken Goss, both of 3810 Almar Rd., Grants Pass, Oreg. 97527

[21] Appl. No.: 09/196,178

[22] Filed: Nov. 20, 1998

[51] Int. Cl.⁷ .............................. G01S 5/14; A63B 71/02; G01C 3/08

[52] U.S. Cl. .............................. 342/125; 342/42; 342/44; 342/46; 342/47; 342/51; 342/118; 342/195; 342/458; 342/463; 473/131; 473/407; 273/108.2; 375/200

[58] Field of Search .............................. 273/317.2, 108.2, 273/245; 434/252; 463/3; 473/131, 150, 151, 172, 174, 175, 180, 185, 190, 192, 198, 199, 407; 342/42, 43, 44, 45, 46, 47, 48, 49, 50, 51, 118, 125, 145, 146, 175, 176, 195, 458, 463; 375/200

[56] References Cited

U.S. PATENT DOCUMENTS

| | | | |
|---|---|---|---|
| 3,868,692 | 2/1975 | Woodard et al. | 342/458 |
| 4,698,781 | 10/1987 | Cockerell, Jr. | 342/463 |
| 4,703,444 | 10/1987 | Storms, Jr. et al. | 342/463 |
| 5,056,106 | 10/1991 | Wang et al. | 375/200 |
| 5,298,904 | 3/1994 | Olich | 342/42 |
| 5,311,271 | 5/1994 | Hurt et al. | 342/118 X |
| 5,364,093 | 11/1994 | Huston et al. | 473/407 |
| 5,797,809 | 8/1998 | Hyuga | 473/407 |

*Primary Examiner*—Bernarr E. Gregory

[57] ABSTRACT

A golf distance indicator system provides measurement and display of the distance between a golfer and the pin on the green he is approaching. The system comprises a portable unit carried by the golfer and an target unit located on the pin. With the portable unit, the golfer selects the hole he is playing then activates the system. The portable unit sends a wireless coded message to an intended target unit. When a target unit receives a message, it analyzes the message to see if it should respond. If the target unit determines that it should respond, it sends a coded responding message to the portable unit. When the portable unit receives a responding message, it analyzes the responding message to see if the responding message originates from the intended target unit. If it does, the portable unit calculates a distance based on the elapsed time for the communications and the speed of the communications. The results are displayed on the portable unit.

5 Claims, 6 Drawing Sheets

DISTANCE INDICATOR SYSTEM FOR GOLF

This invention relates to devices used primarily in the game of golf. More particularly, the invention relates to a system for measuring distances from the player to a selected target on a golf course. Generally, the selected target is the pin flag for the green of the hole currently being played. An alternate target could be an nearby bunker or water hazard. While the invention is specifically directed towards golf, it can be appreciated that the system can by used in other fields where a user wishes to know the distance to a specified target.

BACKGROUND OF THE ART

Devices which enable a golfer to determine distances to targets are known.

One device for measuring distances utilizes sonar techniques to direct a ultrasonic or infrared signal to the pin. The device measures the time elapsed to receive the return signal reflected from the pin. This device requires the golfer to aim the device accurately to the pin, which may be difficult.

Other devices calculate distances by receiving signals from global positioning satellites (GPS). These devices, while accurate, are complex and relatively expensive.

U.S. Pat. No. 3,868,692 entitled "Golf Yardage Finder" is disclosed by Woodward et al. The device comprises a portable unit which selectively receives different RF (Radio Frequency) signals sent by different transmitters located on different pins. The strength of the received signal is proportional to the distance to the pin. Here, the transmitters for each pin are always emitting their signals, which causes more power consumption for the transmitters.

U.S. Pat. No. 4,136,394 entitled "Golf Yardage Indicator System" is disclosed by Jones et al. This device utilizes bi-directional communications between a remote unit and a target unit located on a pin. The remote unit transmits an activation message to the target unit. The target unit responds by emitting a responding message to the portable unit. The remote unit measures the elapsed time between sending the activation message and receiving the responding message to calculate the distance to the pin. Amongst other features, the remote unit also allows the user to provide wind speed information which can be used by the remote unit to indicate how far and where a shot should be aimed to compensate for the wind. However, this invention does not discriminate between response messages sent from different target units which may be near each other. As such, the user will not know what distance is being measured.

SUMMARY OF THE INVENTION

Accordingly the present invention provides a distance indicator system for providing the distance between a golfer and a pin flag on a golf course. The distance indicator system comprises a target unit associated with the pin flag and a portable unit used by the golfer.

The portable unit comprises a microprocessor, selection means to select said target unit, an activator, an encoding means for encoding a signature signal of the target unit into an initiation signal, a transmitter for transmitting the initiation signal to said target unit, a receiver for receiving a responding signal from the portable unit, a decoder for decoding and extracting a responding signature signal from said responding signal, a processing unit for comparing the responding signature signal an identity signal for the target unit, a distance calculation unit which calculates a distance based on transmission characteristics of the initiating signal and the responding signal and a display device.

The target unit comprises a microprocessor, a receiver for receiving initiation signals broadcasted from a portable device, an unit to extract the signature signal from the received signals and a processing unit for determining intended target unit from said initiation signal. The target unit also includes an encoder to encode a responding signature into a responding signal and a transmitter for broadcasting the responding signal to the portable device.

It is an aspect of this invention that the target unit and the portable unit actively receive and transmit signals to each other.

Many other features and advantages of this invention will be more fully understood from the following detailed description when taken in conjunction with the accompanying drawings.

DETAILED DESCRIPTION OF THE DRAWINGS

Figure 1:
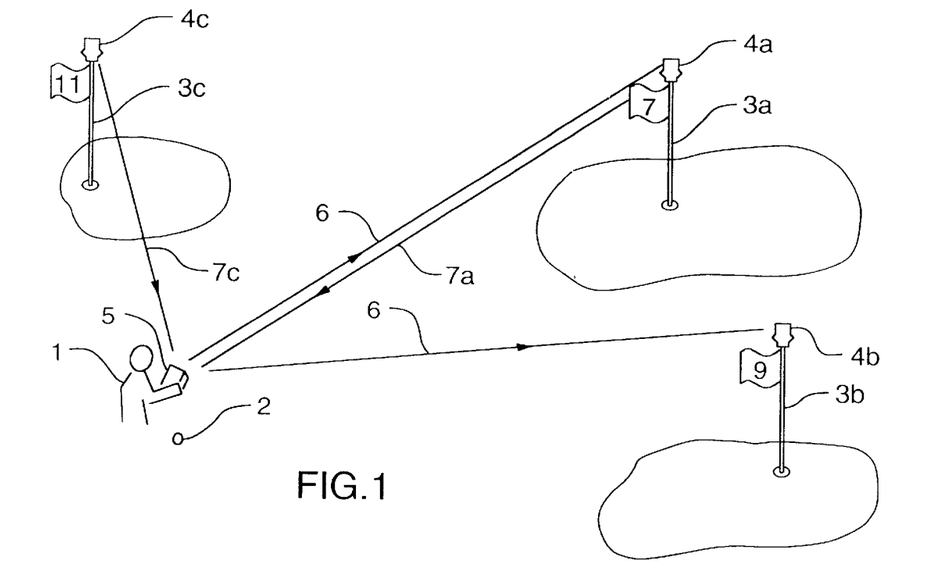
FIG. 1 is a perspective diagram illustrating a golfer using the invention on a golf course.

FIG. 1 shows a typical situation where the invention may be used. Golfer 1, standing by his ball 2, carries portable unit 5. He is playing the hole ending at pin 3a, which has target unit 4a mounted to its top. Nearby holes are indicated by pins 3b and 3c, which have target units 4b and 4c respectively mounted to their tops. It can be appreciated that other target units can be located near other significant objects, such as bunkers or water hazards. Transmitted signals broadcasting from portable unit 5 are indicated by arrows 6. A responding signal broadcasting from target unit 4a is indicated by arrow 7a. A responding signal broadcasting from target unit 4c is indicated by arrow 7c.

The measuring system operates by first having the portable unit broadcast an encoded initiation signal to its intended target unit. When the intended target unit receives the initiation signal, it analyzes the signal and, if appropriate, send an encoded responding message. When the portable unit receives the responding signal, it analyzes that signal and, if appropriate, calculates and displays the distance to the target unit.

In FIG. 1, target unit 4a is the intended target for portable unit 5. While many target units may receive initiation signal 6, the initiation signal contains a signature signal unique to target unit 4a. As such, if target units 4b or 4c receive initiation signal 6, they analyze the signal and will determine that the signature signal is not theirs. Accordingly, they will not respond to initiation signal 6. However, when target unit 4a receives initiation signal 6, analyzes it and recognizes its signature signal, it will initiate responding signal 7a.

Portable unit 5 can receive responding signals transmitted from any target unit. However, the portable unit will only make a distance calculation when it receives responding signal 7a, as it is only expecting responding signal 7a. As shown in FIG. 1, responding signal 7c is sent by target unit 4c and is intended to respond to a different portable unit. While portable unit 5 receives responding signal 7c, it does not execute a distance calculation for the hole associated with target unit 4c.

The invention described herein uses digital signatures which are encoded and transmitted as analog signals. However, it can be appreciated that strictly analog signals may be used as the signatures.

Figure 2:
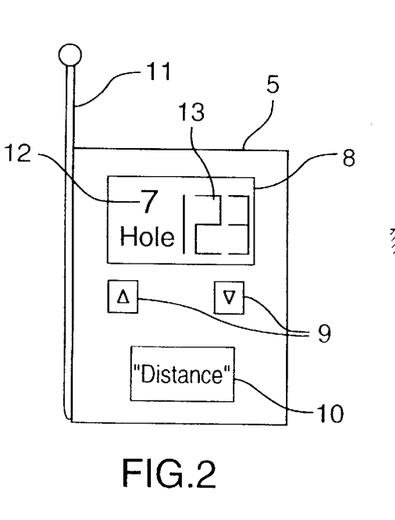
FIG. 2 is a illustrates one embodiment of the portable unit.

FIG. 2 shows one possible form of portable unit 5. While the exact appearance of the unit may differ, it has the following elements. Selector buttons 9 allow the user to scroll up and scroll down through the holes in the golf course, which is displayed in reading 12 in the display window 8. It can be appreciated that various selector mechanisms can be used, including dials or keypads. Once the intended hole is selected (here, the user has selected the seventh hole), the user activates the measuring system of the invention by pressing activation button 10, labeled "DISTANCE". After portable unit 5 completes communications with the target unit of the intended hole, it calculates the distance thereto and displays the result as distance reading 13 in display window 8. Here the calculated distance is "123" yards. All communications sent and received by portable unit 5 are transmitted and received through antenna 11.

Figure 3:
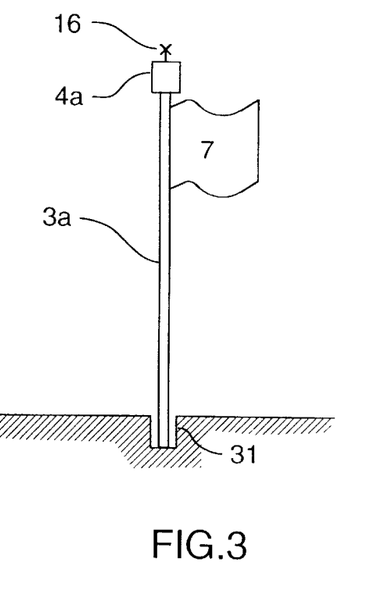
FIG. 3 illustrates one embodiment of the target unit on a golf pin.

FIG. 3 shows a details of the target unit 4a. Pin 3a functions as a conventional pin for hole 31, but also has target unit 4a mounted on its top. All communications sent and received by target unit 4a are processed through antenna 16.

Figure 4:
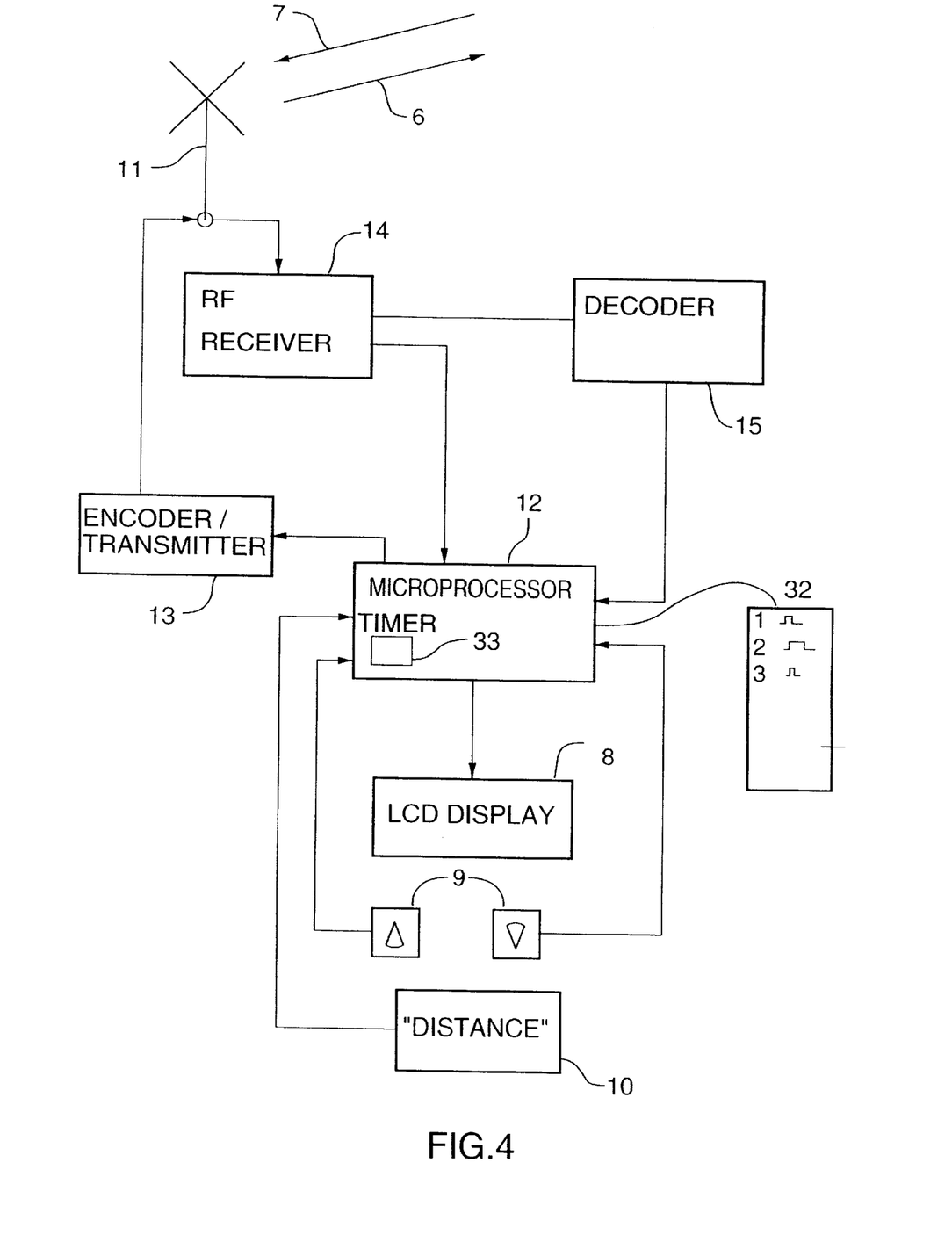
FIG. 4 is a block diagram of the major functional elements of the portable unit.

FIG. 4 shows the major functional blocks of portable unit 5. The main controlling element of portable unit 5 is microprocessor 12. It controls all the functional elements, performs the distance calculations and controls the display of the results.

To use the portable unit, selector buttons 9 are used to select the intended hole. Microprocessor 12 updates display 8 by causing it to show the current hole selected as the user cycles through his hole selections. Once the intended hole has been selected, the user presses activation button 10 to initiate the measuring system.

Figure 6:
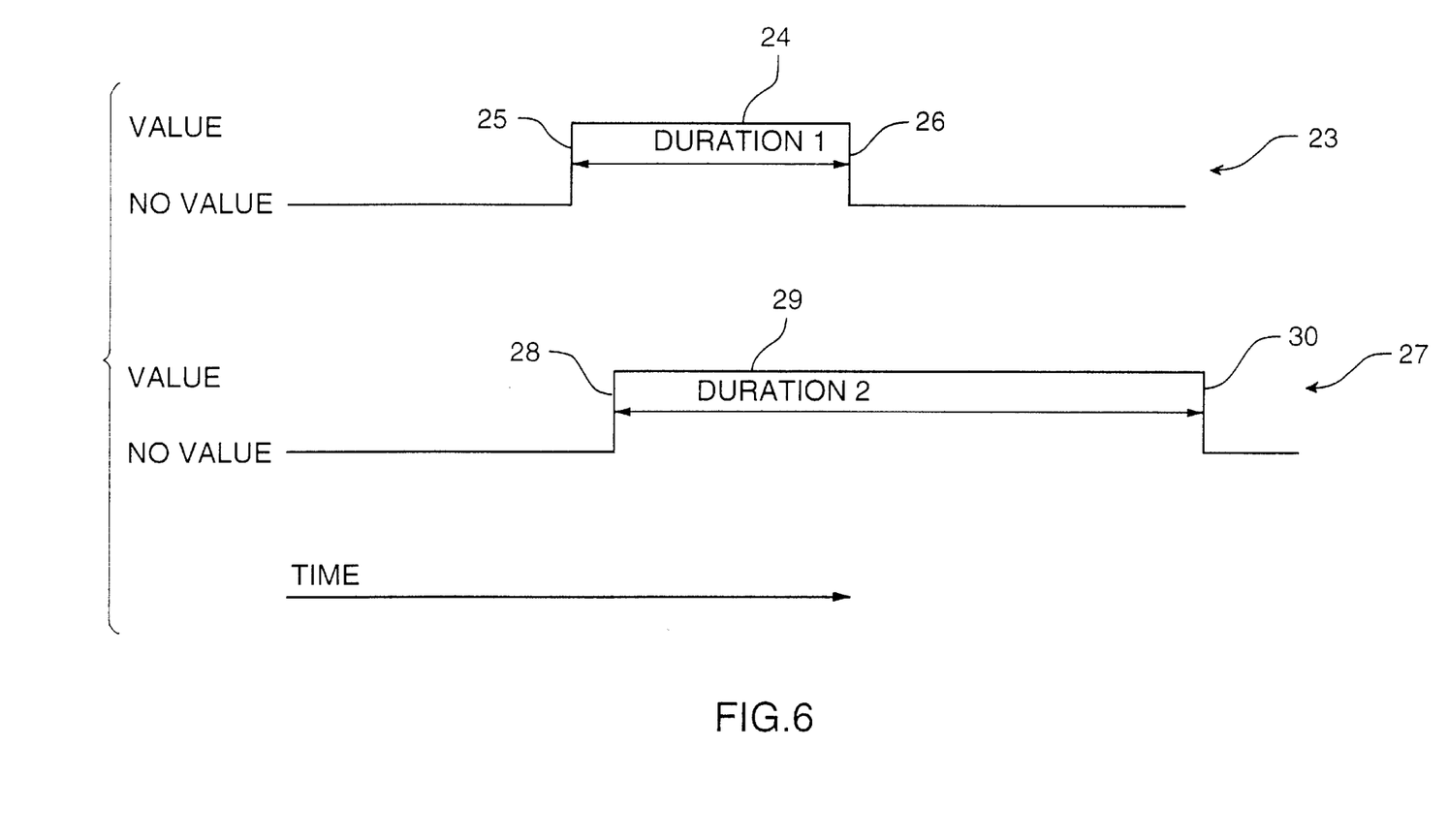
FIG. 6 is a timing diagram of two representative digital signature signals for two different target units.

Referring to FIG. 4, portable unit S has a list 32 which contains information on digital signatures associated with each target unit. FIG. 6 shows representations of two digital signatures for two different target units. Each signature is a digital pulse of a different length. In the present embodiment, pulse 23 has a leading edge 25, a length of duration 1, indicated at 24, and a trailing edge 26. Pulse 27 has leading edge 28, a length of duration 2, indicated at 29, and a trailing edge 30. The target unit for each hole has a unique digital signature associated with it. It can be appreciated that other digital signatures may be used, which may be represented by a series of unique digital "0" and "1" values.

When the portable unit is activated, Encoder/Transmitter 13 selects the digital signature associated with intended target unit from list 32 and converts the signature to an analog signal. The analog signature signal is modulated onto a radio frequency carrier producing initiation signal 6. Thereafter, initiation signal 6 is transmitted through antenna 11. It can be appreciated that other wireless transmission techniques may be used, including SONAR or infrared signals.

Around that instant, microprocessor 12 starts an internal timer 33. The timer is used in the distance calculation. The timer 33 is turned off when portable unit 5 receives a responding signal from a target unit.

Figure 5:
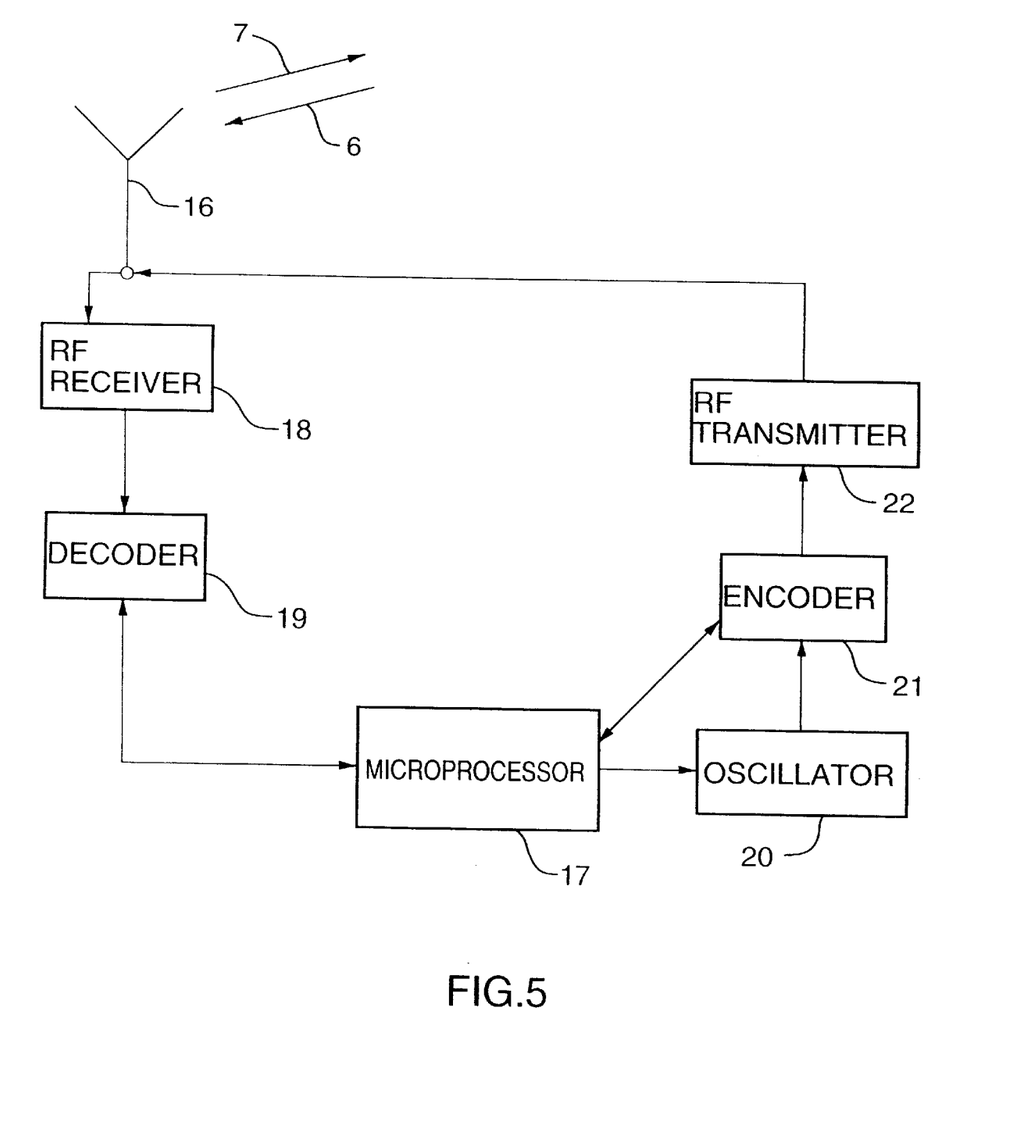
FIG. 5 is a block diagram of the major functional elements of the target unit.

FIG. 5 illustrates details of target unit 4a, which receives and processes initiation signal 6. Using the signature signal encoded in the initation signal, a target unit can determine if a received initiation signal is intended for it. To accomplish this, the analog signature is extracted from the received initiation signal, then it is converted it to a digital signature. The digital signature is used to determine if the initiation signal was intended for the target unit.

Initiation signal 6 is received by target unit 4a through antenna 16. RF receiver 18 processes the signal and sends it to decoder 19. Decoder 19 removes the carrier frequency from initiation signal 6, thereby leaving only the analog signature signal. This signal is converted to its digital equivalent for processing by the decoder. Then, microprocessor 17 compares the resulting digital signature to the signature signal of target unit 4a. If the received signature matches the signature pulse of target 4a, then target unit 4a knows that a portable unit is requesting a response from it. If they do not match, target unit will not respond to the signal.

To generate a response, encoder 21 produces the digital signature signal for target unit 4a. This signal is then converted to its analog signal. The preferred method of converting the signal uses pulse width modulation techniques; however, other digital signals can be generated by other commercially available devices or by using other encoding techniques. Encoder 21 then combines the analog signal with the transmission radio frequency generated by oscillator 20, producing responding signal 7. RF transmitter 22 and antenna 16 are used to transmit responding signal 7. It is preferred that the same RF used to broadcast the initiation signal is used to broadcast the responding signal. However, it is possible that different radio frequencies may be used.

FIG. 4 shows details of portable unit 5, which processes received responding signals. Responding signal 7 is received by portable unit 5 through antenna 11. RF receiver 14 sends the received response to decoder 15. Decoder 15 isolates the signature signal from the responding signal, then signature to its digital format. In this preferred embodiment, the digital signature is a pulse. However, it can be appreciated that other digital and analog signatures may be used to identify the target unit associated with the responding signal.

Referring to FIGS. 4 and 6, when the leading edge 25 of the pulse 23 is recognized, microprocessor 12 stops its internal timer 33. The pulse is sent to decoder 15 for signature verification. In the present embodiment decoder 15 comprises a monostable multivibrator. It is the length of the pulse which provides the signature. If duration 24 matches the duration of the pulse associated with intended target unit 4a, then encoder 15 and microprocessor 5 will cooperate to determine that a responding signal from the intended target unit was received. As such, microprocessor 5 then calculates a distance based on the elapsed time in its internal timer 33 and the frequency of the carrier frequency. This value is displayed on display 8.

If duration 24 does not match the digital signature of the intended target unit 4a, then the received responding signal 7 is from another target unit. As such, portable unit 5 sends another initiation signal 6 through antenna 11 and waits for a response. If after several retries, either no response or responses are received from another target unit, the portable unit cannot calculate a distance to intended target unit 4a. In this condition, microprocessor 12 causes an error message to be displayed on display 8.

It can be appreciated that in another embodiment, the target unit may generate its responding signal 7 whenever it receives any initiation signal intended for any target unit. In this embodiment, when the responding signal is received by each portable unit, each portable unit must evaluate the signal to determine if the replying target unit was the intended target unit.

Figure 7:
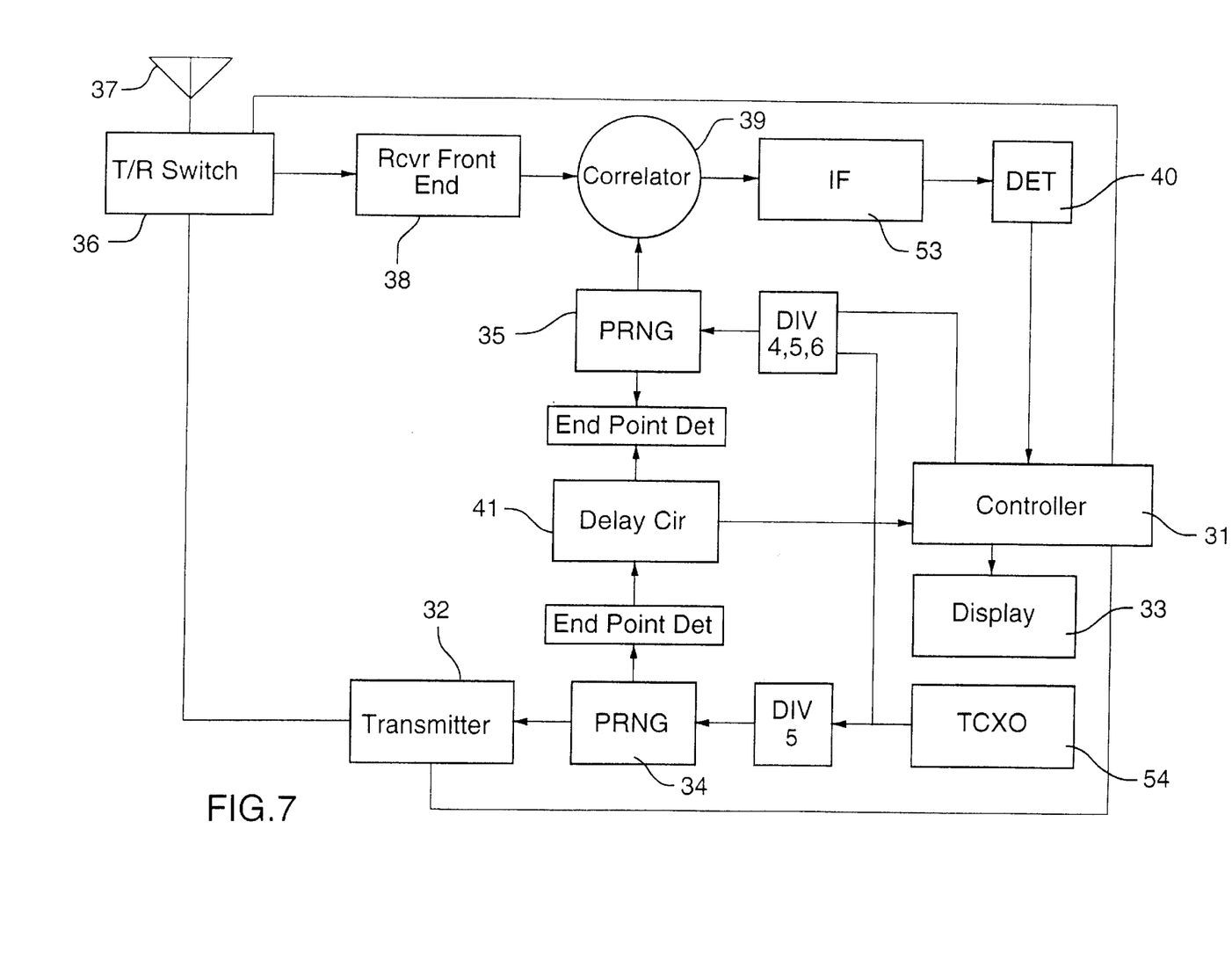
FIG. 7 is a block diagram showing detail of the major functional elements of another embodiment of the portable unit.

FIG. 7 shows a block diagram of the elements of another embodiment of portable unit 5. Herein, the functional components of portable unit 5 comprise controller 31, transmitter 32, display 33, pseudo random number generators 34 and 35, transmit/receive switch 36, antenna 37, receiver front end 38, correlator 39, detector 40, oscillator 54, intermediate frequency box 53 and delay circuit 41.

Figure 8:
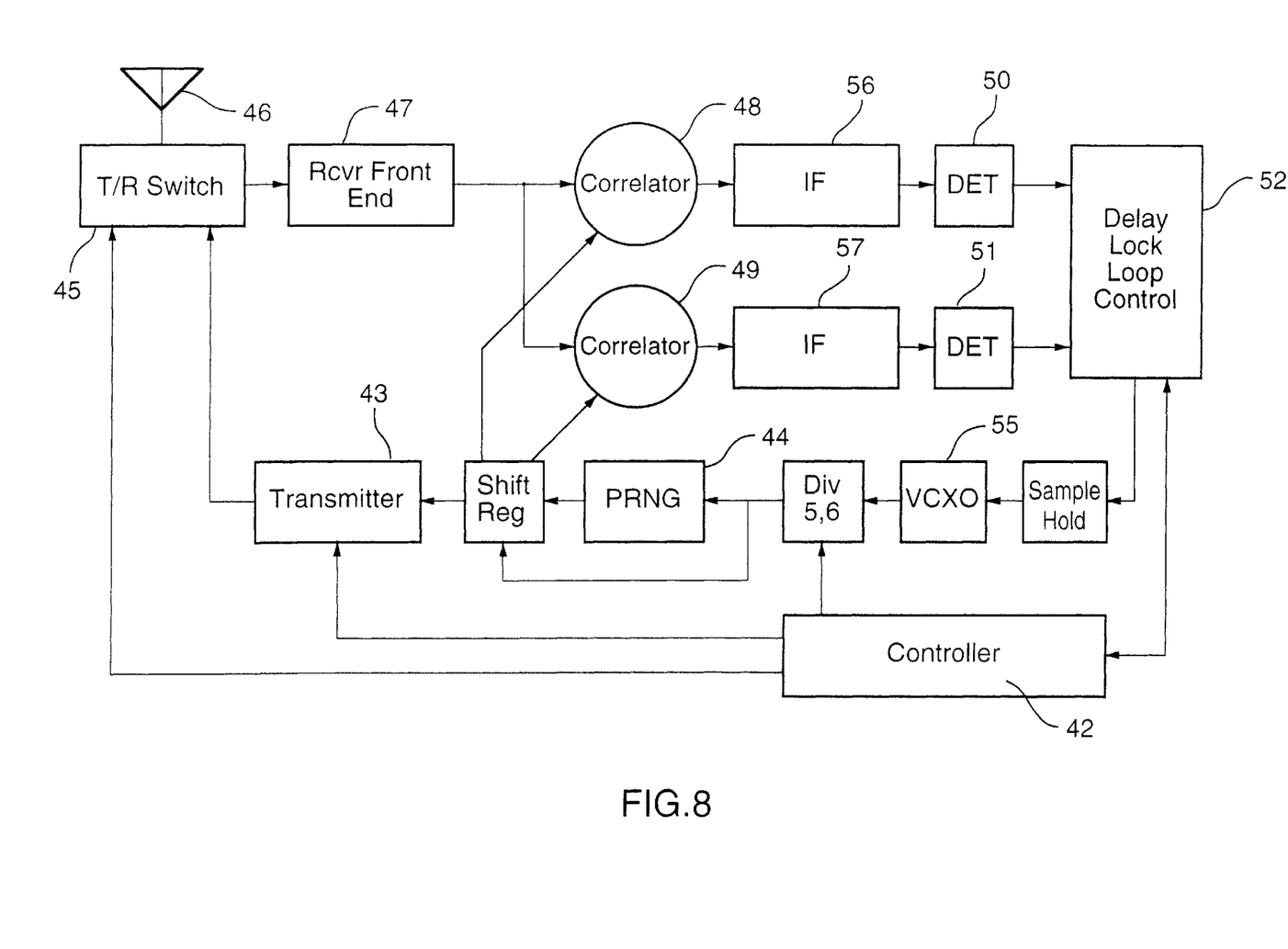
FIG. 8 is a block diagram showing detail of the major functional elements of another embodiment of the target unit.

FIG. 8 shows a block diagram of the elements of antoher embodiment of the target unit 4. The functional components of target unit 4 comprise controller 42, transmitter 43, pseudo random number generator 44, transmit/receive switch 45, antenna 46, receiver front end 47, oscillator 55, correlators 48 and 49, detectors 50 and 51 and delay lock loop control circuit 52.

Referring to FIGS. 7 and 8, portable unit 5 measures the round trip propagation delay from the portable unit to the target unit and back.

When the portable unit is activated, a high rate pseudo random number sequence is generated by PRNG 34 and is transmitted through transmitter 31, transmitter switch 36 and antenna 37. The signal is encoded in spread spectrum techniques. The number sequence is unique to the target unit being interrogated. During this time the target unit will synchronize to this data stream.

The target unit receives the transmitted number sequence via antenna 46, receive switch 45, front end receiver 47, correlators 48 and 49, detectors 50 and 51 and delay lock control 52. The correlators determine whether the number sequence received is for the unit, and if so, the signal is de-spread. The duplicated correlators and detectors and the delay lock control provide synchronization of the received signal. Intermediate frequency boxes 56 and 57 along with detectors 50 and 51 determine whether the strength of the received de-spread signal is corresponds to the correct number sequency. If so, controller 42 responds with the same number sequence by generating the sequence through PRNG 44, then transmits it through transmitter 43, transmit switch 45 and antenna 46. Again, the signal is encoded with spread spectrum techniques.

At the portable unit, the signal sent from the target unit is received through antenna 37, receiver front end 38 and correlator 39. Correlator 39 determines whether the received spread signal is for it, and if so, the signal is de-spread. Intermediate frequency box 53 and detector 40 check the level of the received signal and if appropriate notify controller 31 that a signal has been received. Thereafter, the controller will measure the time delay between the number sequence originally sent and the received number sequence. This time delay is converted to indicate the distance between the portable unit and the target unit. The distance is shown on display 33.

To avoid timing ambiguities due to multipath propagation of signals, delay circuit 41 spreads the transmission of the number sequence. To identify the incident signal, the direction of search is in the direction of increasing delay, thereby minimizing the probability of locking onto a reflected ray.

It can be appreciated that in another embodiment, the distance calculation may be based on non-temporal means, such as the strength of the responding signal received by the portable unit.

While specific embodiments of the present invention have been illustrated herein, it will be understood that variations and modifications may be effected without departing from the spirit and scope of the invention.

The embodiments of the invention in which an exclusive property or privilege is claimed are defined as follows:

1. A distance indicator system for a golf course comprises a portable unit carried by a golfer and a target unit,
    said target unit comprising
        a first microprocessor;
        a first receiver for receiving an initiation signal from said portable unit;
        a decoding and extraction means for decoding and extracting a first signature signal from said initiation signal;
        a first processing means for comparing said first signature signal against an internal signature of said target unit;
        a first encoding means for generating a responding signal containing a second signature signal unique to said target unit when said first signature signal matches said internal signature;
        a first transmission unit for transmitting said responding signal to said portable unit
    said portable unit comprising
        a second microprocessor;
        a selection means to select said target unit;
        an initiation means to activate said distance indicator system;
        a second encoding means for encoding said first signature signal of said target unit into said initiation signal when said initiation means is activated;
        a second transmission unit for transmitting said initiation signal to said target unit;
        a second receiver for receiving said responding signal from said portable unit;
        a second decoding and extracting means for decoding and extracting said second signature signal from said responding signal;
        a second processing unit for comparing said second signature signal against an identity signal associated with said target unit;
        a distance calculation unit which calculates a distance based on transmission characteristics of the initiating signal and the responding signal when said second signature signal matches said identity signal; and
        a display device to display said distance on said portable unit.

2. The device in claim 1 wherein said portable unit further comprises a timer which is started when said initiation signal is sent and is turned off when said portable unit receives a responding signal.

3. The device in claim 2 wherein said distance calculation unit calculates said distance using the time value of said timer.

4. The device in claims 1 wherein said initiation and responding signals are encoded in radio frequency signals.

5. A distance indicator system for providing the distance between a golfer and a pin flag on a golf course, said distance indicator system comprising a target unit having a unique signature for identification associated with said pin flag, said target unit comprising

- a first microprocessor;
- a first receiver for receiving an initiation signal modulated on radio frequency signals from a portable unit;
- a decoding unit for decoding and extracting said initiation signal from said radio frequency signals;
- a first processing unit for processing a signature signal from said initiation signal;
- a first encoding unit for generating a responding signal containing said signature signal when first processing unit identifies said signature signal as corresponding to said signature of said target unit;
- a first transmission unit for modulating said responding signal onto said radio frequency signals to said portable device;

said portable unit used by said golfer, comprising

- a second microprocessor;
- a selection means to select an intended target unit to measure the distance to;
- an initiation means to commence said distance indicator system;
- a second encoding unit for generating an initiation signal containing a signature signal corresponding to said selected target unit when said initiation means is activated;
- a second transmission unit for modulating said initiation signal onto said radio frequency signal;
- a second receiver for receiving a responding signal modulated on radio frequency signals from said portable unit;
- a second decoding unit for decoding and extracting said responding signal from said radio frequency signals;
- a second processing unit for processing said signature signal from said responding signal;
- a distance calculation unit which calculates a distance based on the time between sending the initiating signal and receiving the responding signal; and
- a display device to display said distance on said portable unit.

* * * * *